(12) United States Patent
De Bondt et al.

(10) Patent No.: US 10,910,941 B2
(45) Date of Patent: Feb. 2, 2021

(54) AC/DC CONVERTER, LUMINAIRE AND METHOD PROVIDING AN IMPROVED START-UP CIRCUIT

(71) Applicant: SIGNIFY HOLDING B.V., Eindhoven (NL)

(72) Inventors: Guy Louis Paul De Bondt, Herentals (BE); Bertrand Johan Edward Hontele, Breda (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/755,627

(22) PCT Filed: Oct. 10, 2018

(86) PCT No.: PCT/EP2018/077636
§ 371 (c)(1),
(2) Date: Apr. 13, 2020

(87) PCT Pub. No.: WO2019/076704
PCT Pub. Date: Apr. 25, 2019

(65) Prior Publication Data
US 2020/0304016 A1    Sep. 24, 2020

(30) Foreign Application Priority Data

Oct. 17, 2017  (EP) .................................... 17196744

(51) Int. Cl.
*H05B 45/38* (2020.01)
*H02M 1/36* (2007.01)
(Continued)

(52) U.S. Cl.
CPC ......... *H02M 1/36* (2013.01); *H02M 3/33523* (2013.01); *H05B 45/38* (2020.01);
(Continued)

(58) Field of Classification Search
CPC ........ H04B 45/00; H04B 45/30; H04B 45/37; H04B 45/3725; H04B 45/38;
(Continued)

(56) References Cited

U.S. PATENT DOCUMENTS 4,737,851 A    4/1988  Shanley, II et al.
9,812,976 B2 *  11/2017  Choi ........................ H02M 1/36
(Continued)

FOREIGN PATENT DOCUMENTS

JP    2001078357 A    3/2001

*Primary Examiner* — Jimmy T Vu
(74) *Attorney, Agent, or Firm* — Daniel J. Piotrowski

(57) ABSTRACT

The present invention provides an AC/DC converter comprises an input for receiving a rectified AC input signal (Vin), an output for providing a controlled output signal (Vout) to a load (7), a switched mode power converter for transforming the AC input signal (Vin) into the controlled output signal (Vout), wherein the switched mode power converter has an input for receiving a start-up voltage (Vstart) for changing a stand-by mode of the switched mode power converter into an operating mode of the switched mode power converter, a control circuit (5) for receiving a control signal (Vctl), a kick-start power supply (6) for receiving a switch-on signal (Von) to supply the start-up voltage (Vstart) being larger than a power supply voltage (Vsup), an auxiliary power supply (4) for supplying the power supply voltage (Vsup) to the control circuit (5) and the kick-start power supply (6), wherein the control circuit (5) is arranged for activating the switch-on signal (Von) to activate the kick-start power supply (6) for turning the switched mode power converter from the stand-by mode into the operating mode.

11 Claims, 3 Drawing Sheets

(51) Int. Cl.
*H05B 45/385* (2020.01)
*H05B 45/382* (2020.01)
*H02M 3/335* (2006.01)
*H02M 1/00* (2006.01)

(52) U.S. Cl.
CPC ......... *H05B 45/382* (2020.01); *H05B 45/385* (2020.01); *H02M 2001/0032* (2013.01)

(58) Field of Classification Search
CPC .... H04B 45/382; H04B 45/385; H04B 45/39; H04B 47/00; H04B 47/10; H02M 1/36; H02M 3/325; H02M 3/33507; H02M 3/33523; H02M 3/33561; H02M 3/33569
See application file for complete search history.

(56) References Cited

U.S. PATENT DOCUMENTS

| | | |
|---|---|---|
| 2003/0169606 A1 | 9/2003 | Miermans |
| 2008/0175027 A1 | 7/2008 | Shimada et al. |
| 2010/0146307 A1 | 6/2010 | Griffin, Jr. et al. |
| 2012/0025608 A1 | 2/2012 | Melanson et al. |
| 2012/0039096 A1* | 2/2012 | Dunipace ................ H02M 1/36 363/21.12 |
| 2012/0326502 A1 | 12/2012 | Nguyen et al. |
| 2015/0163874 A1 | 6/2015 | Roberts |
| 2015/0365001 A1 | 12/2015 | Klesyk et al. |
| 2017/0070138 A1 | 3/2017 | Ogawa et al. |

* cited by examiner

AC/DC CONVERTER, LUMINAIRE AND METHOD PROVIDING AN IMPROVED START-UP CIRCUIT

CROSS-REFERENCE TO PRIOR APPLICATIONS

This application is the U.S. National Phase application under 35 U.S.C. § 371 of International Application No. PCT/EP2018/077636, filed on Oct. 10, 2018, which claims the benefit of European Patent Application No. 17196744.1, filed on Oct. 17, 2017. These applications are hereby incorporated by reference herein.

FIELD OF THE INVENTION

The invention relates to an AC/DC converter with an improved start-up circuit. The invention further relates to a luminaire comprising the AC/DC converter with an improved start-up circuit. The invention further relates to a method for providing an improved start-up for an AC/DC converter.

BACKGROUND OF THE INVENTION

In switched mode power supplies, a voltage to the switched mode power converter is required that allows the switch mode power supply to start up. This voltage is provided via a start-up circuit. When the switched mode power converter has started up, a fraction of the output power of the switched mode power converter can be fed back allowing the switched mode power converter to operate. In general, the start-up circuit is a cheap, low efficient circuit. A commonly used, simple, embodiment is a starting resistor, bleeder, and a storage capacitor for storing the energy provided to the switched mode power converter. It is common practice to tap the rectified input voltage of the switched mode power converter circuit. This is normally rectified mains which ranges between 120 V RMS and 230 V RMS. The voltage required to start the operation of the switched mode power converter is normally in the range of 10 to 30 V. Therefore, the bleeder has to limit the current from the rectified mains voltage to generate a significant lower voltage which will result in a very low power efficiency.

US 2017/0070138 discloses that the start-up circuit can be disconnected from the rectified mains when the switched mode power converter has started up. Disconnection is done by a switch that opens when the switched mode power converter has started up. No power is dissipated in the start-up circuit resulting in an increased efficiency of the switched mode power converter.

The start-up circuit that taps the rectified input voltage comprises high voltage components. The additional switch required to turn off the start-up circuit is also a high voltage component. Therefore, the start-up circuit is relatively large and costly. Furthermore, during stand-by operation, the start-up circuit is active and still some power is being dissipated.

SUMMARY OF THE INVENTION

It is an objective of the invention to provide an AC/DC converter that has a start-up circuit that is small in size and also very cheap.
To overcome this concern, in a first aspect of the invention, an AC/DC converter is provided comprising:

an input for receiving a rectified AC input signal;
an output for providing a controlled output signal to a load;
a switched mode power converter for transforming the AC input signal into the controlled output signal, wherein the switched mode power converter has an input for receiving a start-up voltage for changing a stand-by mode of the switched mode power converter into an operating mode of the switched mode power converter;
a control circuit for receiving a control signal;
a kick-start power supply for supplying the start-up voltage being larger than a power supply voltage and for receiving a switch-on signal,
an auxiliary power supply for supplying the power supply voltage to the control circuit and the kickstart power supply,
wherein the control circuit is arranged for activating the switch-on signal to activate the kick start power supply for turning the switched mode power converter from the stand-by mode into the operating mode.

The effect of the AC/DC converter being configured as claimed allows that a small kick-start power supply can be implemented to provide enough energy to allow the switch mode power converter to start up. This kick-start power supply can be turned off when the AC/DC converter is in standby. The total power dissipation of the AC/DC converter during standby is therefore lowered.

In a further example, the kick start power supply is arranged for stopping to supply the start-up voltage when the switched mode power converter has changed into the operating mode.

After the start-up of the switched mode power converter, the start-up voltage can be supplied via another path, such that power is provided by the switched mode power converter. Therefore, the kick-start power supply can be turned off to avoid further energy losses.

In a further example, the control circuit is arranged for disabling the kick start power supply after the switched mode power converter has changed into the operating mode.

The control circuit controls not only the turning on of the kick-start power supply, it now also further controls the turning off of the kick-start power supply. A single control circuit may be used for controlling the kick-start power supply. This simplifies the control of the kick-start power supply.

In a further example, the auxiliary power supply circuit is arranged to draw power from the rectified AC input signal.

The auxiliary power supply draws power from the rectified AC input signal. This provides an easy and robust provision of power to the auxiliary power supply.

In a further example, the auxiliary power supply circuit is arranged to draw power from a battery.

The battery provides a voltage to the auxiliary power supply that can be chosen to be lower than the rectified AC input signal. When the AC/DC converter is in stand-by, the battery can still provide energy to the auxiliary power supply, further reducing the stand-by power losses.

In a further example, the battery is provided with power by the controlled output signal or an auxiliary output.

The battery is now being charged by a voltage provided by the switched mode power converter. The voltage provided to the battery can be chosen such that a more efficient energy transfer can be achieved.

In a further example, the kick-start power supply is a boost converter.

For transforming a low input voltage to a higher output voltage, an efficient solution is to use a boost converter.

In a further example, the start-up voltage is provided to the switched mode power converter by the controlled output signal after enabling of the switched mode power converter.

In a further example, the switched mode power converter comprises a transformer wherein an auxiliary winding of the transformer provides the start-up voltage to the switched mode power converter in the operating mode.

When the switched mode power converter has started up, a voltage provided by an auxiliary winding, magnetically coupled to an inductor of the switched mode power converter, provides the start-up voltage to the switched mode power converter.

In another example, a luminaire is provided comprising:
the AC/DC converter according to any of the preceding claims; and
the load.

The luminaire is equipped with the improved AC/DC converter and has therefore an improved stand-by power consumption.

In another example, the load is an LED load.

LED loads consume a small amount of power. Therefore, for AC/DC converters driving an LED load, stand-by power is more relevant since a low amount of stand-by power already has a significant impact on the overall energy consumption.

BRIEF DESCRIPTION OF THE DRAWINGS

Examples of the invention will now be described with reference to the accompanying drawings, in which.

DETAILED DESCRIPTION OF THE EMBODIMENTS

Figure 1:
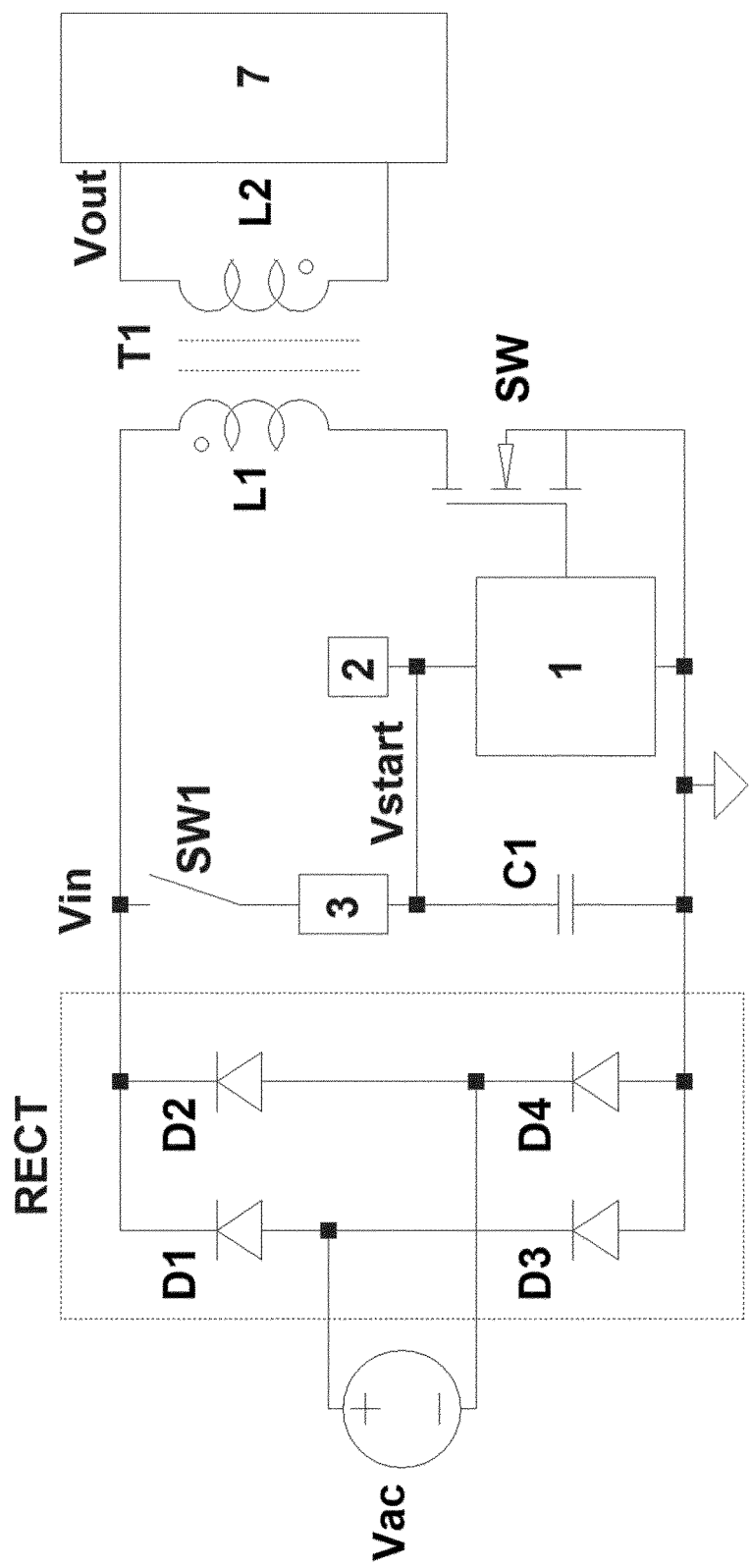
FIG. 1 shows an example of a prior art AC/DC converter with a start-up circuit.

FIG. 1 shows an example of a commonly used AC/DC converter having a start-up circuit. A rectifier bridge RECT comprises diodes D1, D2, D3 and D4 and is coupled to an AC voltage source Vac. This voltage may be the mains voltage. This AC voltage is rectified by the rectifier bridge RECT. The rectified AC voltage Vin is used to provide a voltage to a start-up circuit 3. The start-up circuit 3 provides a voltage to an input of the switched mode power converter controller 1. If the voltage exceeds an undervoltage lock-out threshold, the switched mode power converter controller 1 will become active and consequently control the switch SW. The undervoltage lock-out threshold can be as high as 10 V to 30 V. The switched mode power converter further comprises a transformer T1, the transformer T1 having a primary winding L1 and a secondary winding L2, for providing power to the output. When the output power is sufficient, a fraction of the output power is provided via connection 2 to the switched mode power converter controller 1. A switch SW1 is used to disconnect the start-up circuit 3 from the rectified mains connection to avoid energy losses in the start-up circuit 3 during normal operation of the switched mode power converter. The power to the switched mode power converter controller 1 is then provided only via connection 2. This connection 2 usually is a connection to an auxiliary winding of the transformer T1. The voltage generated by the auxiliary winding exceeds the undervoltage lock-out threshold voltage and allows the AC/DC converter to keep operating.

The switch SW1 and the start-up circuit 3 are coupled to the rectified input voltage and therefore high voltage components to withstand mains voltage. These components are relatively large in order to support the high mains voltage and are also relative expensive.

The invention proposes a different approach wherein a low cost, small kick-start driver 6 is introduced for starting up the switched mode power converter controller 1.

Figure 2:
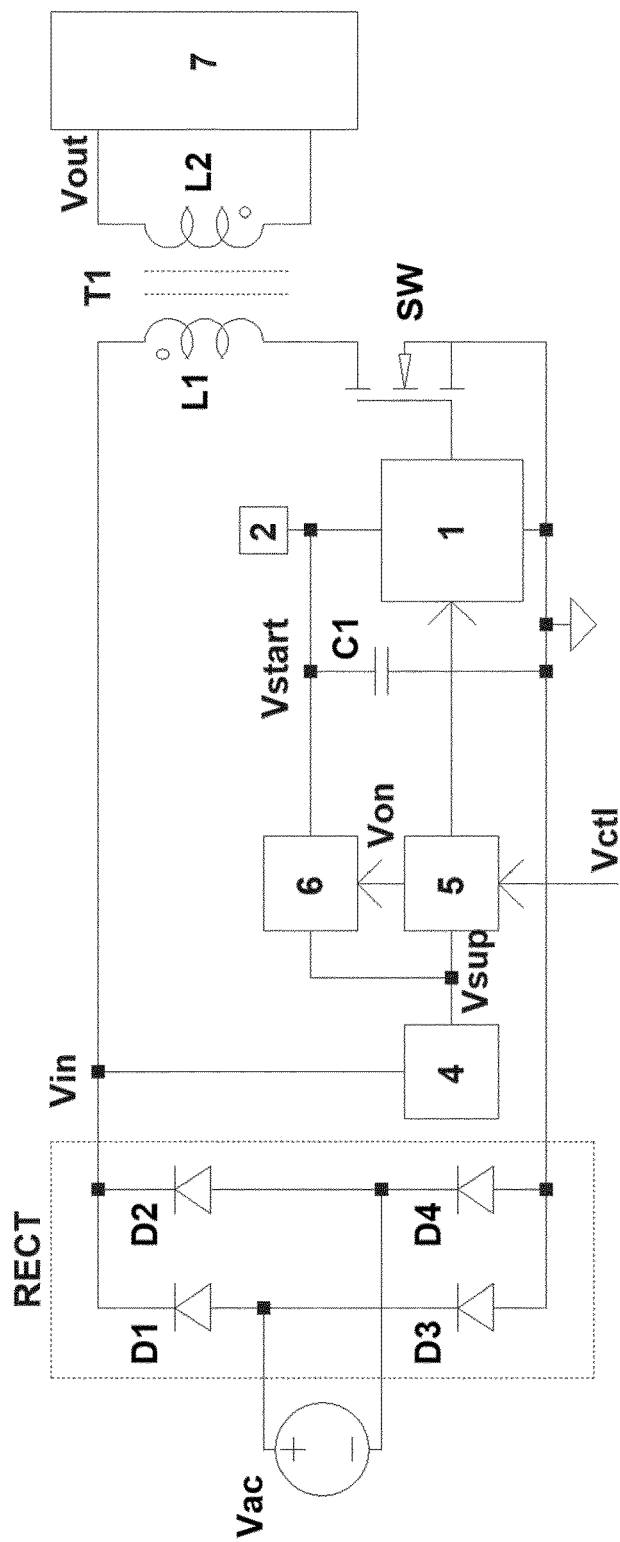
FIG. 2 shows an embodiment of the invention

FIG. 2 shows an example of an AC/DC converter with an improved start-up circuit. An input of an auxiliary power supply 4 is coupled to a rectified AC voltage Vin. An output of the auxiliary power supply 4 is coupled to an input of a control circuit 5 and to an input of a kick-start power supply 6. An output of the kick-start power supply 6 is coupled to an input of a switched mode power converter controller 1. An output of the control circuit 5 is coupled to another input of the switched mode power converter controller 1. An output of the switched mode power converter controller is coupled to a control terminal of a switch SW. the switch SW forms together with an inductor L1 or a transformer T1 a switched mode power supply. An output of the switched mode power supply is coupled to a load 7. A connection may further be connected to an input of the switched mode power converter controller 1. The auxiliary power supply 4 is used to provide a supply voltage Vsup to a control circuit 5. The auxiliary power supply 4 is also active when the AC/DC converter is in stand-by mode. The control circuit 5 may be arranged to receive a control signal. The control circuit 5 may further be configured to control the switched mode power converter controller 1 by e.g. turning it off. The control circuit 5 may further control the kick-start power supply 6 by providing a turn on signal Von to the kick-start power supply 6 for turning it on and off. The kick-start power supply 6 may be a boost converter. The kick-start power supply 6 receives a low voltage provided by the auxiliary power supply 4. This allows that the start-up circuit only needs to provide power during start-up of the switched mode power converter, therefore reducing power dissipation during standby, as will be elucidated in the now following. The auxiliary power supply 4 provides a low voltage to the control circuit 5. This can be in the order of 3.3 V to 5 V for supplying a voltage to e.g. a microcontroller. The low voltage that is supplied by the auxiliary power supply 4 is too low to allow the switched mode power converter controller 1 to go in the operating mode. Therefore, the kick-start power supply 6 boosts the voltage supplied by the auxiliary power supply 4 to exceed the minimum required voltage. The boosted voltage is supplied to the switched mode power converter controller 1. The voltage is sufficient for the switched mode power converter controller 1 to go into the operating mode and to control the switch SW. The switch SW is coupled to at least an inductor, such that they form a switched mode power converter. The exemplary switched mode power converter shown in FIG. 2 is a flyback converter comprising a transformer T1 having a primary side inductor L1, which is magnetically coupled to a secondary side inductor L2. The secondary side is coupled to a load. In the prior art, the start-up circuit 3 is always active during standby since the switched mode power supply needs to be activated directly when a control signal Vctl is provided for starting up the switched mode power supply. Therefore, the start-up circuit 3 will always dissipate power during standby.

When the control circuit 5 receives a control signal Vctl, the control circuit 5 will generate a signal for activating the kick-start power supply 6. The kick-start power supply 6 will in response to the signal start up and provide a voltage that is larger than the low voltage supplied by the auxiliary power supply 4 and thus larger than the undervoltage lock-out threshold required by the switched mode power converter controller 1 to change the standby mode into the normal operating mode of switched mode power converter 1. The capacitor C1 serves as a buffer to stabilize the voltage provided to the switched mode power converter controller 1. The switched mode power converter controller 1 in its turn becomes active and starts controlling the switch SW.

The control circuit 5 may also provide additional signals to the switched mode power converter controller 1. Examples of these signals are dimming signals and turn off signals, which provide additional control possibilities for the switched mode power converter controller 1. The switched mode power converter controller 1 controls the switch SW such that a controlled power is provided to the output of the AC/DC converter and the load 7. The output voltage Vout or an auxiliary voltage Vaux can be fed back via connection 2 to the switched mode power converter controller 1. This allows the kick-start power supply 6 to turn off, reducing the losses in the AC/DC converter.

The turn off of the kick-start power supply 6 may be done by sensing the voltage provided to the switched mode power converter controller 1. If the voltage provided via connection 2 is larger than the voltage provided by the kick-start power supply 6, the kick-start power supply will not provide any power and can therefore be turned off.

Upon receiving another control signal Vctl, the control circuit 5 may generate a signal for turning off the switched mode power converter controller 1.

Figure 3:
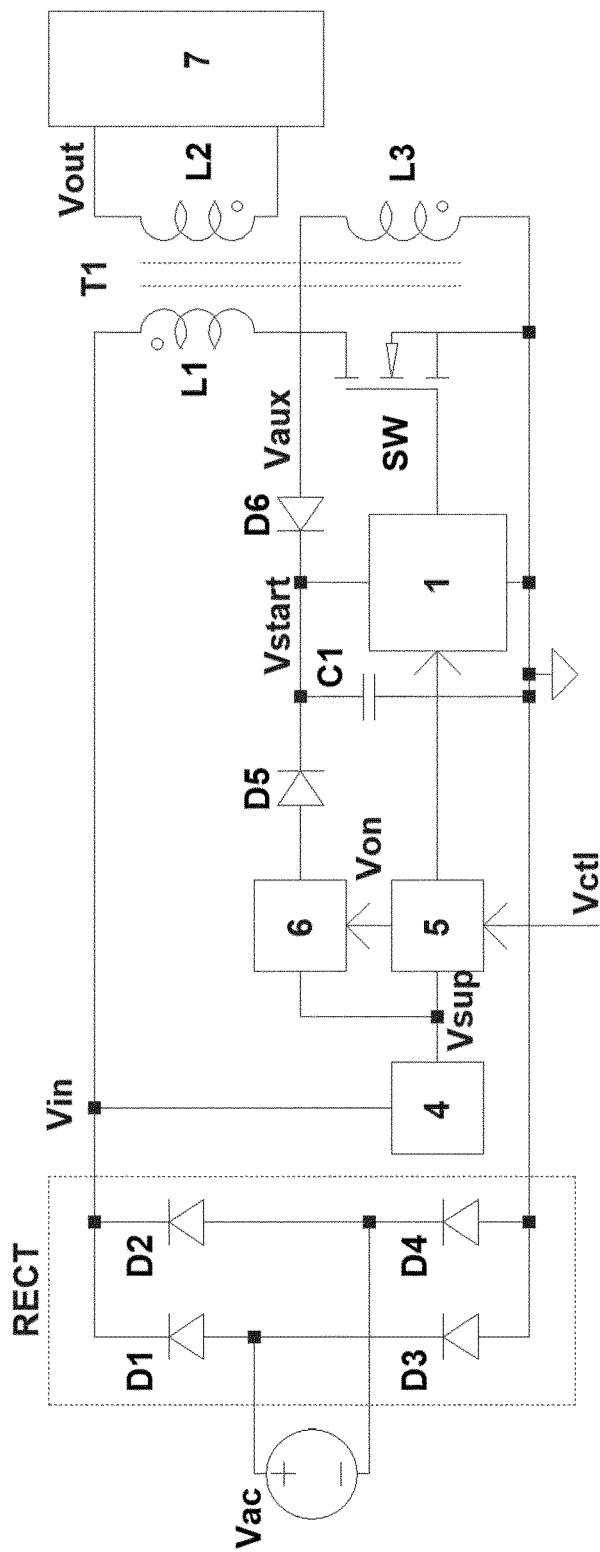
FIG. 3 shows a preferred embodiment of the invention

FIG. 3 shows an example of an AC/DC converter comprising an auxiliary output. The auxiliary output is shown as an auxiliary winding L3 which provides the start-up voltage Vstart to the switched mode power converter controller 1. Similar to FIG. 2, FIG. 3 shows an AC/DC converter with an improved start-up circuit. Instead of providing a voltage via connection 2, the voltage is provided via an auxiliary winding L3. This auxiliary winding L3 is part of the transformer T1. Diodes D5 and D6 may be placed to prevent power to flow from the auxiliary winding L3 to the kick-start power supply 5 and vice versa.

The exemplary switched mode power converter in the figures represents a flyback converter. However, many more types of switched mode power supplies are available. Examples are: buck converter, boost convert, buck-boost converter and resonant converter. The switched mode power converter is controlled by the switched mode power converter controller 1.

The control signal Vctl may be send/received wired or wireless between the control circuit 5 and an external control device, such as a remote control.

The load 7 can be an LED load. LEDs consume a low amount of power. During stand-by, the power consumption is mainly based on stand-by power consumption. The start-up circuit 3 in the prior art contributes to the losses during stand-by where the improved kick-start circuit 6 according to the invention does not consume any power during stand-by.

The kick-start power supply 6 may be any type of voltage boosting circuit. In an embodiment, the kick-start power supply 6 is a boost converter.

Since the switched mode power converter may be any kind of power converter, it has to be noted that the auxiliary winding may also be used as an auxiliary winding magnetically coupled to the inductor of any of the switched mode power converter topologies.

Furthermore, the AC/DC converter may be equipped with a battery for providing power to the auxiliary power supply 4. The battery may be charged by the output of the AC/DC converter or the auxiliary output.

The invention claimed is:

1. A luminaire comprising:
   an LED load
   an input for receiving a rectified AC input signal (Vin);
   an output for providing a controlled output signal (Vout) to the LED load;
   a switched mode power converter for transforming the AC input signal (Vin) into the controlled output signal (Vout), wherein the switched mode power converter has an input for receiving a start-up voltage (Vstart) for changing a stand-by mode of the switched mode power converter into an operating mode of the switched mode power converter;
   a control circuit for receiving a control signal (Vctl);
   a kick-start power supply for receiving a switch-on signal (Von) to supply the start-up voltage (Vstart) being larger than a power supply voltage (Vsup),
   an auxiliary power supply for supplying the power supply voltage (Vsup) to the control circuit and the kick-start power supply,
   wherein the control circuit is arranged for activating the switch-on signal (Von) to activate the kick-start power supply for turning the switched mode power converter from the stand-by mode into the operating mode.

2. The luminaire according to claim 1 wherein the kick-start power supply is arranged for stopping to supply the start-up voltage when the switched mode power converter has changed into the operating mode.

3. The luminaire according to claim 1 wherein the control circuit is arranged for disabling the kick-start power supply after the switched mode power converter has changed into the operating mode.

4. The luminaire according to claim 1 wherein the auxiliary power supply is arranged for drawing power from the rectified AC input signal.

5. The luminaire according to claim 1 wherein the auxiliary power supply is arranged for drawing power from a battery.

6. The luminaire according to claim 5 wherein the battery is coupled to the controlled output signal (Vout) or an auxiliary output (Vaux) for receiving power.

7. The luminaire according to any one of the preceding claims wherein the kick-start power supply comprises a boost converter.

8. The luminaire according to claim 6 wherein the start-up voltage is provided to the switched mode power converter by the controlled output signal or the auxiliary output (L3), after enabling of the switched mode power converter.

9. The luminaire according to claim 1 wherein the switched mode power converter comprises a transformer (T1) comprising an auxiliary winding (L3) for providing the start-up voltage to the switched mode power converter in the operating mode.

10. A method for providing a start-up voltage (Vstart) to a switched mode power converter comprising the steps of:
    supplying a power supply voltage (Vsup) to a control circuit and a kick-start power supply;
    receiving a control signal (Vctl) by the control circuit for turning on the switched mode power converter;
    transforming the power supply voltage (Vsup) to a start-up voltage (Vstart), the start-up voltage (Vstart) being larger than the supply voltage (Vsup);

providing the start-up voltage (Vstart) to the switched mode power converter for turning the switched mode power converter from a stand-by mode into an operating mode.

11. The method according to claim 10, wherein the provision of the start-up voltage (Vstart) to the switched mode power converter is stopped when the switched mode power converter has started up.

\* \* \* \* \*